(12) United States Patent
Cormier et al.

(10) Patent No.: US 11,904,388 B2
(45) Date of Patent: Feb. 20, 2024

(54) METAL DROP EJECTING THREE-DIMENSIONAL (3D) OBJECT PRINTER HAVING AN INCREASED MATERIAL DEPOSITION RATE

(71) Applicant: ADDITIVE TECHNOLOGIES LLC, Palm City, FL (US)

(72) Inventors: Denis Cormier, Pittsford, NY (US); Santokh S. Badesha, Pittsford, NY (US); Varun Sambhy, Pittsford, NY (US)

(73) Assignee: Additive Technologies LLC, Palm City, FL (US)

( * ) Notice: Subject to any disclaimer, the term of this patent is extended or adjusted under 35 U.S.C. 154(b) by 364 days.

(21) Appl. No.: 17/140,954

(22) Filed: Jan. 4, 2021

(65) Prior Publication Data

US 2022/0212265 A1 Jul. 7, 2022

(51) Int. Cl.
*B22F 12/53* (2021.01)
*B33Y 30/00* (2015.01)
(Continued)

(52) U.S. Cl.
CPC ............... *B22F 12/53* (2021.01); *B05B 1/14* (2013.01); *B22F 10/85* (2021.01); *B33Y 30/00* (2014.12)

(58) Field of Classification Search
CPC ...... B22F 12/53; B22F 10/85; B22F 2999/00; B22F 10/22; B22F 12/90; B22F 12/33;
(Continued)

(56) References Cited

U.S. PATENT DOCUMENTS

2006/0192812 A1 8/2006 Arazaki
2009/0091600 A1 4/2009 Fannin et al.
(Continued)

FOREIGN PATENT DOCUMENTS

DE 10 2015 223 540 A1 6/2017
EP 2 969 315 B1 12/2020
EP 3 815 817 A1 5/2021

OTHER PUBLICATIONS

European Patent Office, Extended European Search Report corresponding to European Patent Application No. 22 15 0083 (10 pages), dated May 18, 2022, Munich, Germany.

*Primary Examiner* — Rebecca Janssen
(74) *Attorney, Agent, or Firm* — Maginot Moore & Beck LLP

(57) ABSTRACT

A three-dimensional (3D) object printer has an ejector head with a single nozzle that is fluidly connected to a plurality of orifices in an orifice plate of the ejector head. An ejection of material through the single nozzle is emitted through the plurality of orifices simultaneously. In one embodiment, some of the orifices are oriented at an angle to a normal to the plane of the orifice plate. A splicer of the printer that generates machine ready instructions for operation of the printer identifies a standoff distance between the orifice plate and a surface onto which drops are being ejected to achieve a target drop spacing for the drops ejected onto the surface. In this manner, a material density for structure within a layer can be achieved without needing to increase the ejection frequency significantly or requiring the printer to incorporate multiple ejector heads.

3 Claims, 9 Drawing Sheets

(51) Int. Cl.
*B05B 1/14* (2006.01)
*B22F 10/85* (2021.01)

(58) Field of Classification Search
CPC ........... B05B 1/14; B33Y 30/00; B33Y 50/02; B33Y 10/00; B33Y 40/00
See application file for complete search history.

(56) References Cited

U.S. PATENT DOCUMENTS

| | | |
|---|---|---|
| 2011/0043555 A1 | 2/2011 | Xie |
| 2014/0291886 A1 | 10/2014 | Mark et al. |
| 2015/0273769 A1 | 10/2015 | Korn |
| 2017/0087632 A1 | 3/2017 | Mark |
| 2017/0182798 A1* | 6/2017 | Sugai ..................... B41J 2/175 |
| 2018/0126640 A1 | 5/2018 | Tyler et al. |
| 2019/0217538 A1 | 7/2019 | Katon et al. |
| 2019/0329487 A1 | 10/2019 | Korn |
| 2019/0375003 A1 | 12/2019 | Mark |
| 2020/0276823 A1 | 9/2020 | Thomas et al. |

* cited by examiner

METAL DROP EJECTING THREE-DIMENSIONAL (3D) OBJECT PRINTER HAVING AN INCREASED MATERIAL DEPOSITION RATE

TECHNICAL FIELD

This disclosure is directed to melted metal ejectors used in three-dimensional (3D) object printers and, more particularly, to the ejectors used in those systems.

BACKGROUND

Three-dimensional printing, also known as additive manufacturing, is a process of making a three-dimensional solid object from a digital model of virtually any shape. Many three-dimensional printing technologies use an additive process in which an additive manufacturing device forms successive layers of the part on top of previously deposited layers. Some of these technologies use ejectors that eject UV-curable materials, such as photopolymers or elastomers. The printer typically operates one or more extruders to form successive layers of the plastic material that form a three-dimensional printed object with a variety of shapes and structures. After each layer of the three-dimensional printed object is formed, the plastic material is UV cured and hardens to bond the layer to an underlying layer of the three-dimensional printed object. This additive manufacturing method is distinguishable from traditional object-forming techniques, which mostly rely on the removal of material from a work piece by a subtractive process, such as cutting or drilling.

Recently, some 3D object printers have been developed that eject drops of melted metal from one or more ejectors to form 3D objects. These printers have a source of solid metal, such as a roll of wire or pellets, that is fed into a heating chamber where the solid metal is melted and the melted metal flows into a chamber of the ejector. The chamber is made of non-conductive material around which an uninsulated electrical wire is wrapped. An electrical current is passed through the conductor to produce an electromagnetic field to cause the meniscus of the melted metal at a nozzle of the chamber to separate from the melted metal within the chamber and be propelled from the nozzle. A platform opposite the nozzle of the ejector is moved in a X-Y plane parallel to the plane of the platform by a controller operating actuators so the ejected metal drops form metal layers of an object on the platform and another actuator is operated by the controller to alter the position of the ejector or platform in the vertical or Z direction to maintain a constant distance between the ejector and an uppermost layer of the metal object being formed. This type of metal drop ejecting printer is also known as a magneto-hydrodynamic printer.

Most metal drop ejecting printers have a single ejector that operates at an ejection frequency in a range of about 50 Hz to about 1 KHz and that ejects drops having a diameter of about 50 μm. This firing frequency range and drop size extends the time required to form metal objects over the times needed to form objects made with thermoplastic or other known materials. Some metal drop ejecting printers have one or more ejector heads, but the provision of multiple ejector heads is expensive and makes the system more complex and, in some systems, unwieldy. Other metal drop ejecting printers have ejector heads that have more than one nozzle fluidly coupled to a common manifold. If the number of nozzles is sufficient to appreciably increase the material deposition rate of the ejector head, the ejected drops tend to land simultaneously and overlap with one another. This tendency results in a puddle of metal and cause problems, such as feature definition and the like. If the nozzles are spaced apart adequately to prevent overlap and the problems attendant with overlap, the size of the resulting swath is too large for many object configurations currently produced by such systems. Being able to operate a metal drop ejecting printer to provide higher effective melted metal deposition rates without overly increasing the dimensions of the swaths or ribbons of melted metal would be beneficial.

SUMMARY

A new material drop ejector head provides greater deposition rates than those previously known without overly increasing the size of the swaths produced by the ejector head. The material ejector head includes a single nozzle configured to eject material, and an orifice plate having a plurality of orifices that are fluidly connected to the single nozzle so material ejected from the single nozzle is emitted as drops from the plurality of orifices simultaneously.

A new three-dimensional (3D) object printer includes an ejector head that provides greater deposition rates than those previously known without overly increasing the size of the swaths produced by the ejector head. The 3D object printer includes an ejector head having a single nozzle, the ejector head being configured to eject material through the single nozzle, an orifice plate having a plurality of orifices that are fluidly connected to the single nozzle of the ejector head so material ejected from the single nozzle is emitted as drops from the plurality of orifices simultaneously, a platform positioned opposite the orifice plate, at least one actuator operatively connected to at least one of the platform and the ejector head, the at least one actuator being configured to move the platform and the ejector head relative to one another, and a controller operatively connected to the ejector head and the at least one actuator. The controller is configured to generate machine ready instructions that operate the at least one actuator and the ejector head to achieve a target drop spacing, operate the at least one actuator to move the ejector head and platform relative to one another, and operate the ejector head to eject material through the nozzle and the plurality of orifices so drops ejected from at least two orifices achieve the target drop spacing on the platform or a surface of an object being formed on the platform at the target drop spacing.

BRIEF DESCRIPTION OF THE DRAWINGS

The foregoing aspects and other features of a 3D object printer having an ejector head that provides greater deposition rates than those previously known without overly increasing the size of the swaths produced by the ejector head are explained in the following description, taken in connection with the accompanying drawings.

DETAILED DESCRIPTION

Figure 1:
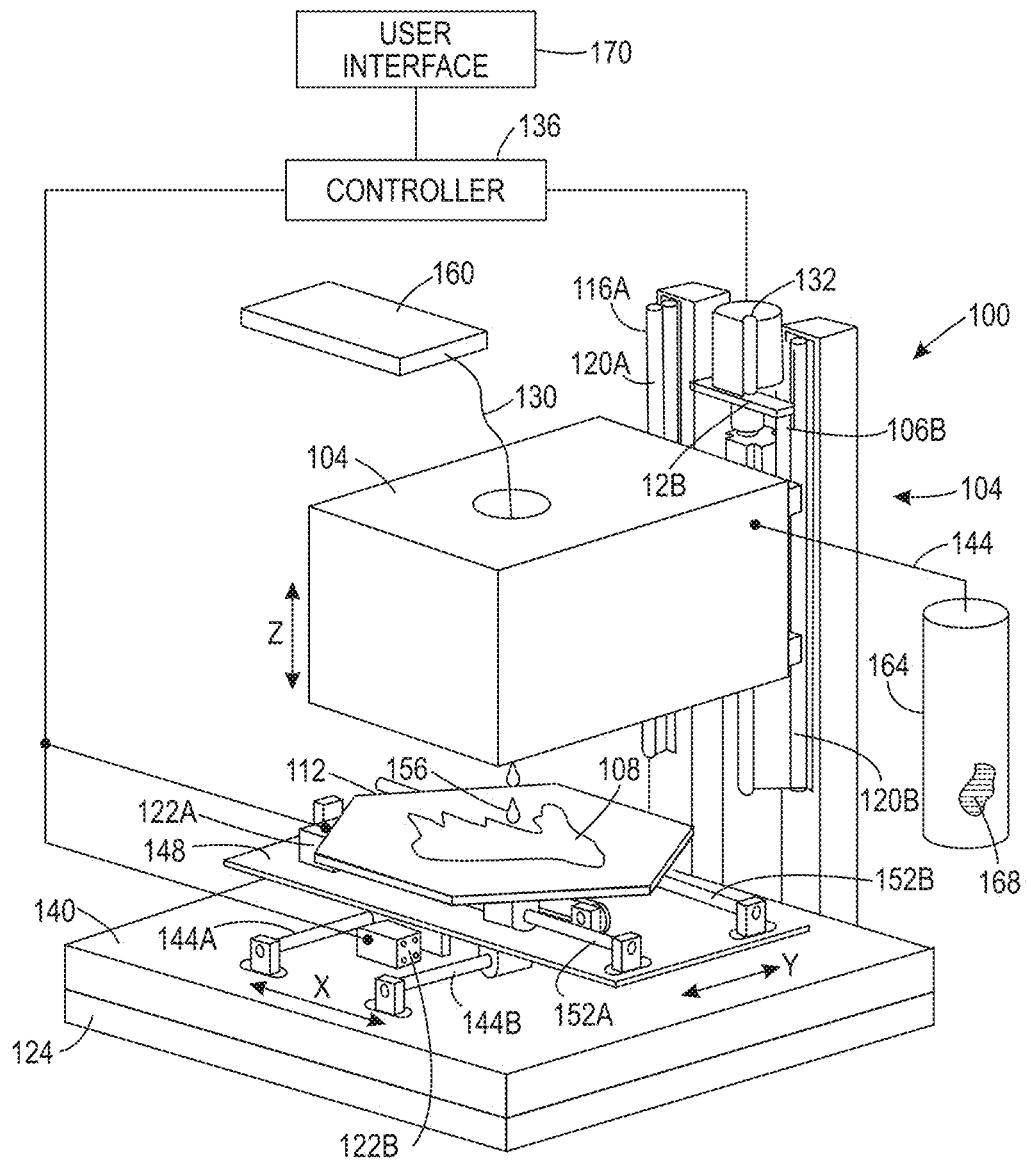
FIG. 1 depicts a 3D object printer that includes an ejector head that provides greater deposition rates than those previously known without overly increasing the size of the swaths produced by the ejector head.

For a general understanding of the environment for the system and its operation as disclosed herein as well as the details for the device and its operation, reference is made to the drawings. In the drawings, like reference numerals designate like elements.

FIG. 1 illustrates an embodiment of a melted metal 3D object printer 100 that provides greater deposition rates than those previously known without overly increasing the size of the swaths produced by the ejector head. In this embodiment, multiple drops of melted bulk metal are simultaneously ejected during each ejection cycle from an ejector head 104 having a single nozzle that is fluidly connected to a plurality of orifices. While the new ejector head and the slicer that takes advantage of the new ejector head is discussed below with reference to the metal drop ejecting system of FIG. 1, the principles embodied in the ejector head and slicer can be used in other 3D object printers, such as those that eject thermoplastic material drops. The drops ejected by the printer of FIG. 1 form swaths for layers of an object 108 on a platform 112. As used in this document, the term "ejection cycle" means a single ejection through the nozzle that is distributed to the connected orifices. As used in this document, the term "bulk metal" means conductive metal available in aggregate form, such as wire of a commonly available gauge, a rod of a commonly available diameter, or pellets of macro-sized proportions. A source of bulk metal 160, such as metal wire 130, is fed into the ejector head and melted to provide melted metal for a chamber within the ejector head. An inert gas supply 164 provides a pressure regulated source of an inert gas 168, such as argon, to the chamber of melted metal in the ejector head 104 through a gas supply tube 144 to prevent the formation of metal oxide in the ejector head.

The ejector head 104 is movably mounted within z-axis tracks 116A and 116B in a pair of vertically oriented members 120A and 120B, respectively. Members 120A and 120B are connected at one end to one side of a frame 124 and at another end to one another by a horizontal member 128. An actuator 132 is mounted to the horizontal member 128 and operatively connected to the ejector head 104 to move the ejector head along the z-axis tracks 116A and 166B. The actuator 132 is operated by a controller 136 to maintain a distance between the nozzle (not shown in FIG. 1) of the ejector head 104 and an uppermost surface of the object 108 on the platform 112.

Mounted to the frame 124 is a planar member 140, which can be formed of granite or other sturdy material to provide reliably solid support for movement of the platform 112. Platform 112 is affixed to X-axis tracks 144A and 144B so the platform 112 can move bidirectionally along an X-axis as shown in the figure. The X-axis tracks 144A and 144B are affixed to a stage 148 and stage 148 is affixed to Y-axis tracks 152A and 152B so the stage 148 can move bidirectionally along a Y-axis as shown in the figure. Actuator 122A is operatively connected to the platform 112 and actuator 122B is operatively connected to the stage 148. Controller 136 operates the actuators 122A and 122B to move the platform along the X-axis and to move the stage 148 along the Y-axis to move the platform in an X-Y plane that is opposite the ejector head 104. Performing this X-Y planar movement of platform 112 as drops of molten metal 156 are ejected toward the platform 112 forms a swath of melted metal drops on the object 108. Controller 136 also operates actuator 132 to adjust the vertical distance between the ejector head 104 and the most recently formed layer on the substrate to facilitate formation of other structures on the object. While the molten metal 3D object printer 100 is depicted in FIG. 1 as being operated in a vertical orientation, other alternative orientations can be employed. Also, while the embodiment shown in FIG. 1 has a platform that moves in an X-Y plane and the ejector head moves along the Z axis, other arrangements are possible. For example, the ejector head 104 can be configured for movement in the X-Y plane and along the Z axis.

The controller 136 can be implemented with one or more general or specialized programmable processors that execute programmed instructions. The instructions and data required to perform the programmed functions can be stored in memory associated with the processors or controllers. The processors, their memories, and interface circuitry configure the controllers to perform the operations previously described as well as those described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits. During metal object formation, image data for a structure to be produced are sent to the processor or processors for controller 136 from either a scanning system or an online or work station connection for processing and generation of the ejector head control signals output to the ejector head 104.

The controller 136 of the melted metal 3D object printer 100 requires data from external sources to control the printer for metal object manufacture. In general, a three-dimensional model or other digital data model of the object to be formed is stored in a memory operatively connected to the controller 136, the controller can access through a server or the like a remote database in which the digital data model is stored, or a computer-readable medium in which the digital data model is stored can be selectively coupled to the controller 136 for access. This three-dimensional model or other digital data model can be used by the controller to generate machine-ready instructions for execution by the controller 136 in a known manner to operate the components of the printer 100 and form the metal object corresponding to the model. The generation of the machine-ready instructions can include the production of intermediate models, such as when a CAD model of the device is converted into an STL data model, or other polygonal mesh or other intermediate representation, which can in turn be processed to generate machine instructions, such as g-code, for fabrication of the device by the printer. As used in this document, the term "machine-ready instructions" means computer language commands that are executed by a computer, microprocessor, or controller to operate components of a 3D metal object additive manufacturing system to form metal objects on the platform 112. The controller 136 executes the machine-ready instructions to control the ejection of the melted metal drops from the ejector head 104, the positioning of stage 148 and the platform 112, as well as the distance between the ejector head 102 and the uppermost layer of the object 108 on the platform 112. The slicer executed by the controller 136 of the printer 100 in FIG. 1 has been modified to identify stand-off distances that take advantage of the multi-orifice plate to achieve target drop spacings as explained below for the generation of the machine ready instructions used with the printer 100.

Figure 2A:
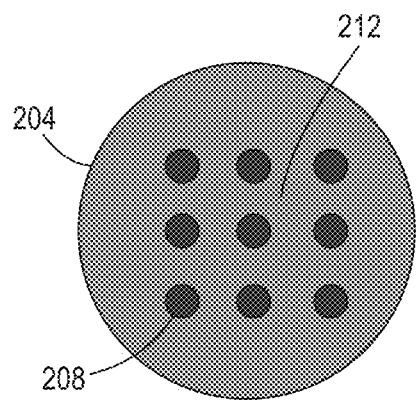
FIG. 2A is a bottom view of the ejector head used in the system of FIG. 1.

A bottom view of the ejector head 104 is shown in FIG. 2A. Covering the nozzle 206 is an orifice plate 204 having nine orifices 208 so an ejection of melted metal into the nozzle 206 produces nine drops of melted metal during each ejection cycle. If each orifice was perpendicular to the orifice plate 204 and had an approximate diameter of 500 μm, then nine discrete drops would land simultaneously on the substrate. With an appropriately large orifice spacing, adjacent drops do not overlap in the X and Y dimensions of the platform 112. By moving the ejector head and platform relative to one another in the X direction, the ejector head could be positioned to eject a subsequent pattern of drops between the previously ejected drops in the rows and then move the ejector head and the platform relative to one another in the Y direction to eject another subsequent pattern of drops between the previously ejected drops in the columns. Yet another X direction shift would need to occur to finish filling the original pattern.

Figure 2B:
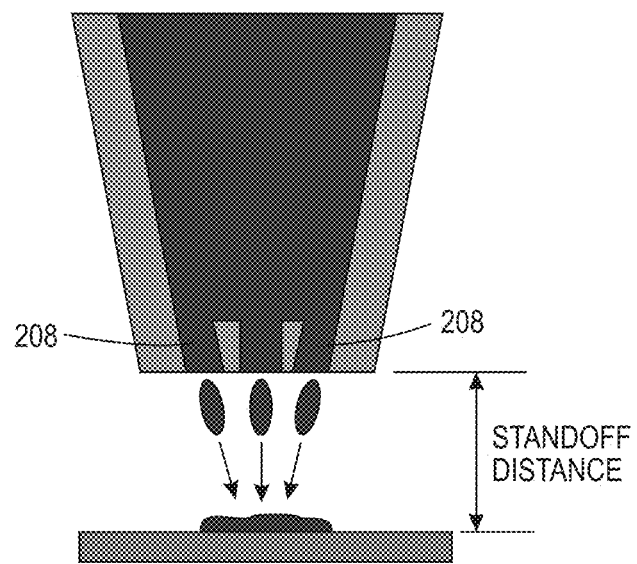
FIG. 2B is a side view of the ejector head of FIG. 2A.
Figure 3A:
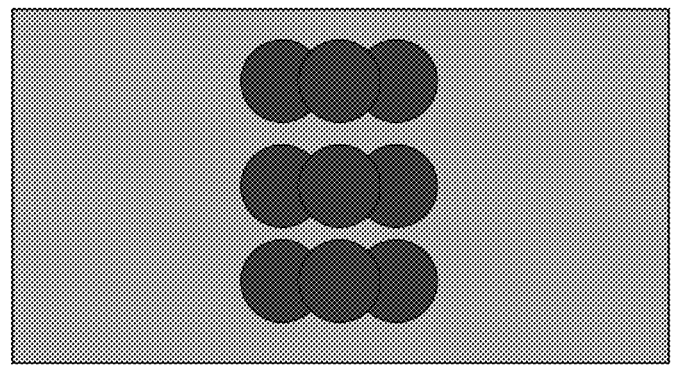
FIG. 3A is an illustration of a drop pattern produced by a single ejection cycle of the ejector head of FIG. 2A

To prevent the requirement for so many movements to fill in the pattern of discrete drops and still obtain the advantage of increased material distribution made possible with the orifice arrangement for the single nozzle, the orifices to the left of the center column of orifices 212 in one embodiment of the orifice plate 204 are angled so the melted metal drops ejected from those orifices converge toward the drop ejected by the orifice in the center column. Also, the nozzles to the right of the center column of orifices 212 in that same embodiment are angled so the melted metal drops ejected from those orifices converge toward the drop ejected by the orifices in the center column. This configuration of orifices is shown in the side view of FIG. 2B. The drops ejected by this configuration only overlap in a single dimension and form three rows of three drops each that are separated from one another in the other dimension of the platform as shown in FIG. 3A. The spacing between the rows is a function of the angle of the longitudinal axes of the orifices with respect to the normal to the orifice plate 204. Subsequent relative movement between the ejector head and the platform in the direction of the orifice columns produces a second set of three drop rows that land between the rows in the first set of rows as shown in the top view of FIG. 3B.

Figure 4A:
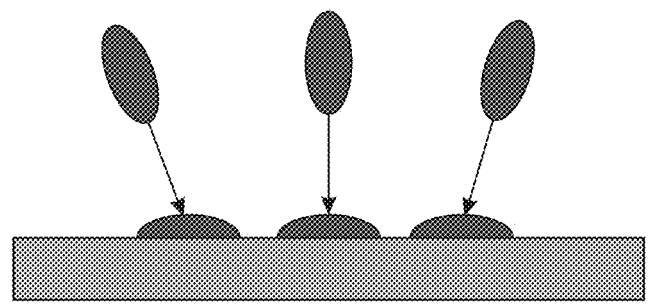
FIG. 4A and FIG. 4B depict the effect of stand-off distance between the orifice plate and the surface being printed.
Figure 4B:
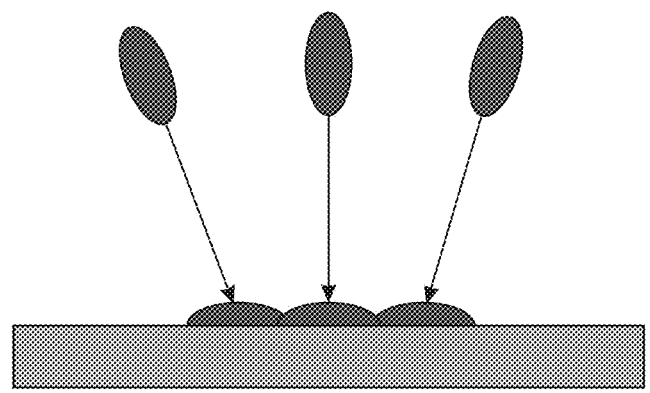

Additionally, the overlap between the drops within a row is a function of the standoff distance between the orifice plate and the surface on which the drops are being ejected. As used in this document, the term "stand-off distance" means the distance between the orifice plate and the surface to which ejected drops are ejected when the drops are ejected. When the stand-off distance between the orifice plate 204 having the angled orifices and the surface being printed is relatively close, the drops do not coalesce as shown in FIG. 4A but when the stand-off distances increases as shown in FIG. 4B, the drops do coalesce on the surface being printed. Thus, by adjusting the standoff distance between the orifice faceplate and the surface receiving the metal drops, the spacing of the drops can be adjusted in a manner similar to the way an image comes into and out of focus with a magnifying glass. Accordingly, the density of metal drops within a row and the spacing between rows can be varied to achieve a target drop spacing within a layer. As used in this document, the term "target drop spacing" means a predetermined distance between the centers of adjacent, ejected drops on the object or platform to which the drops are directed. The predetermined distance between the centers of adjacent, ejected drops on the object or platform to which the drops are directed is also called "drop spacing" in this document. A target drop spacing is determined from layer data for an object to achieve a target material density for structure within the layer.

Figure 3B:
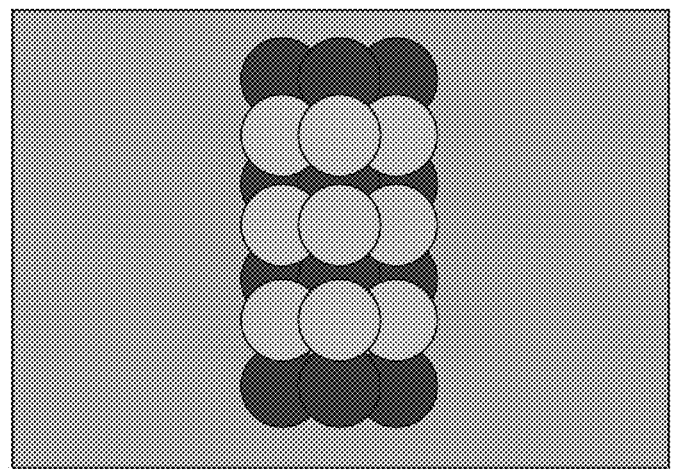
FIG. 3B is the resulting pattern produced by movement of the ejector head of FIG. 2A by a distance between the drops in the pattern and then ejecting a second set of drops in the space between the first set of drops.

As also can be seen in FIG. 3A and FIG. 3B, only one relative movement is needed to fill in the first printed pattern. While this benefit seems to come at the expense of a narrower swath than the pattern formed by the nine non-slanted nozzles, the narrower swath enables ejection through all nine nozzles in more scenarios within a layer than the wider pattern requiring more moves for completely filling the pattern. In another embodiment, the orifices in the orifice plate 204 are parallel with the normal to the plane of the orifice plate but the spacing between adjacent orifices in the plate is reduced from the one used with the orifices of FIG. 2A and FIG. 2B. This orifice configuration results in adjacent drops ejected through the orifice plate overlapping on the surface to which they are directed and coalescing there regardless of the stand-off distance between the orifice plate and that surface.

Figure 5A:
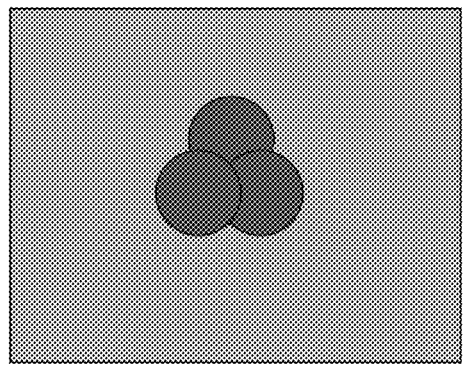
FIG. 5A depicts a drop pattern formed by an alternative nozzle arrangement for an ejector head that can be used in the system of FIG. 1
Figure 5B:
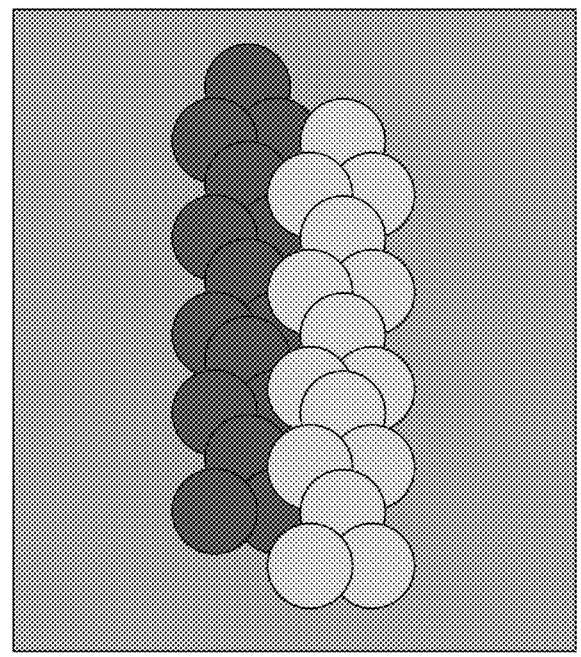
FIG. 5B depicts a double row material drop pattern produced by multiple drop patterns shown in FIG. 5A.

In another embodiment, one of the actuators is operatively connected to the platform 112 to rotate the platform about a normal to the plane of the platform surface to adjust the orientation of row sets to the orientation of previously printed row sets to produce contours and infill areas within a layer perimeter. In another embodiment, the orifices can be arranged in a non-linear configuration. As used in this document, the word "non-linear" means an arrangement of orifices other than rows of orifices that are orthogonal to columns of orifices. For example, a set of three orifices can be arranged in a triangular pattern can produce the partially overlapping triangular pattern shown in FIG. 5A. The angles of the three orifices in the triangular pattern are oriented to direct the drops emitted from the orifices toward the center of the triangular pattern to produce the pattern shown in FIG. 5A. As noted previously, changing the standoff distance can also be used to adjust the amount of overlap between the simultaneously ejected metal drops. Relative movement between the platform and the ejector head is used to determine the starting and stopping positions for subsequent ejector head firings so they are staggered. The pattern illustrated in FIG. 5B is produced by a double row printing of the pattern shown in FIG. 5A.

Figure 6:
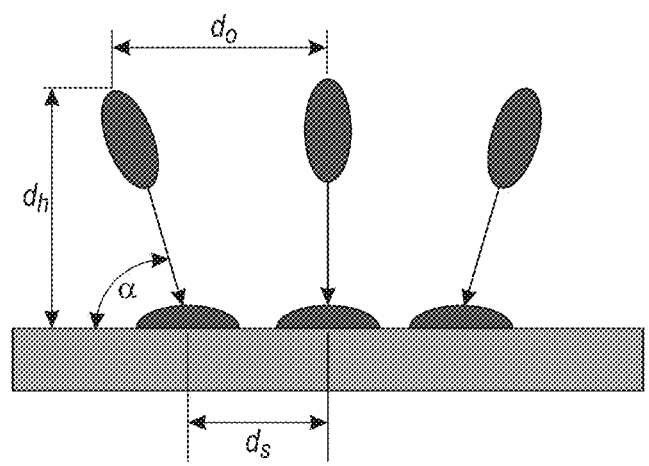
FIG. 6 illustrates how a stand-off distance is identified to achieve a target drop spacing.

The orifices in the orifice plate of the ejector head embodiments discussed above are machined at appropriate angles relative to the X and Y axes of the platform 112. When the slicer receives the digital data model of an object and generates the machine ready instructions to operate the components of the printer to manufacture the object, it determines the stand-off distances, ejection frequencies, and tool path movements required to formation of each object layer. FIG. 6 illustrates the parameters for determining the stand-off distances to achieve a target drop spacing. For any given orifice configuration, the distance between the orifices ($d_o$) and the angle of the axes of orifices with respect to the horizontal plane ($\alpha$) are known. To achieve a desired center-to-center drop spacing ($d_s$), the standoff distance ($d_h$) between the nozzle face plate and the substrate is computed as:

$$d_h = \tan(\alpha) \times (d_o - d_s)$$

Figure 7:
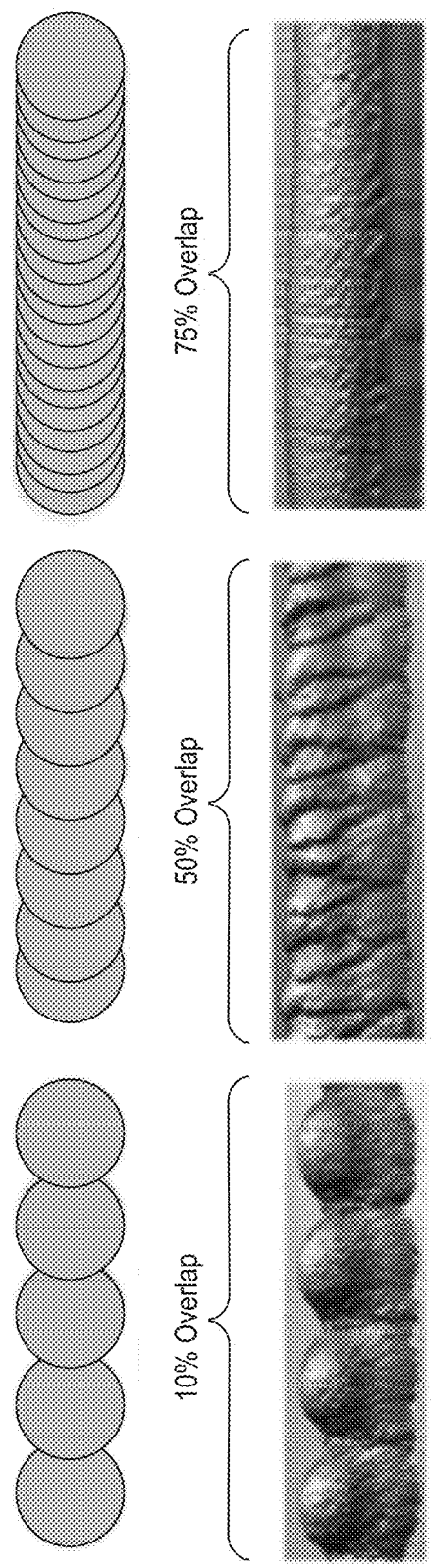
FIG. 7 illustrates the different structures that can be formed from different drop overlaps.
Figure 8:
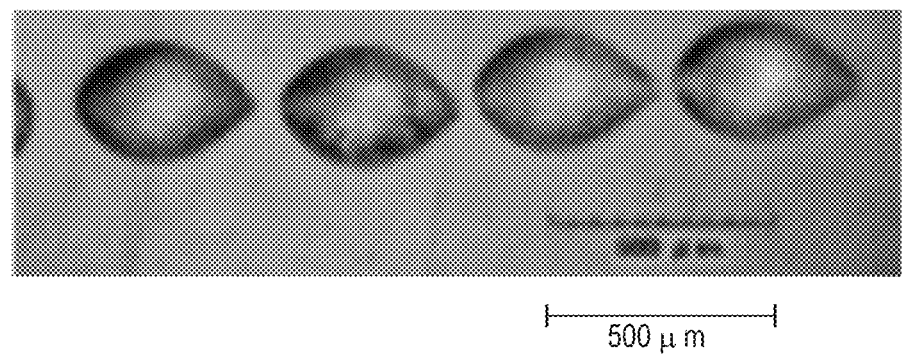
FIG. 8 illustrates a structure that can be formed with no drop overlap.

By increasing or decreasing $d_h$, the drop spacing can be adjusted such that the drops either overlap or do not overlap. In one embodiment, the diameter of drops ejected from an orifice is within +/−50 µm of the orifice diameter. When drops land on the substrate, they typically spread out to some degree. For a nozzle with 500 µm diameter orifices, the droplet diameters would typically be within +/−50 µm of the orifice diameter. If a row of drops that partially overlap to form a continuous trace is the target, then the percentage of overlap between drops (taken as a percentage of the drop diameter) can be controlled to achieve a desired effect as seen in FIG. 7. For structures where overlap is not a goal, for example, a low density porous structure or a weak structure that can easily be removed, a series of isolated drops can be produced as shown in FIG. 8. Again, the stand-off distance is identified as explained above to produce these isolated drops. Once the machine ready instructions are generated, they are executed by the controller of the printer to operate actuators to position the ejector head at the programmed stand-off distance and move the ejector head and platform relative to one another while generating the electromagnetic signals that eject the melted metal drops at a programmed frequency to form structures in a metal object. Use of the angled orifices and operating the ejector head at known frequencies in the range of about 200 Hz to about 2000 Hz increase the material deposition rate of the system 100 over those previously known without needing to increase the ejection frequency significantly or requiring the system to incorporate multiple magnetohydrodynamic (MHD) ejector heads. Thus, a higher material deposition rate of up to nine times over a single nozzle ejector is possible without the substantial increase in system complexity and cost necessitated by higher ejection frequencies and the addition of other MHD ejectors.

Figure 9:
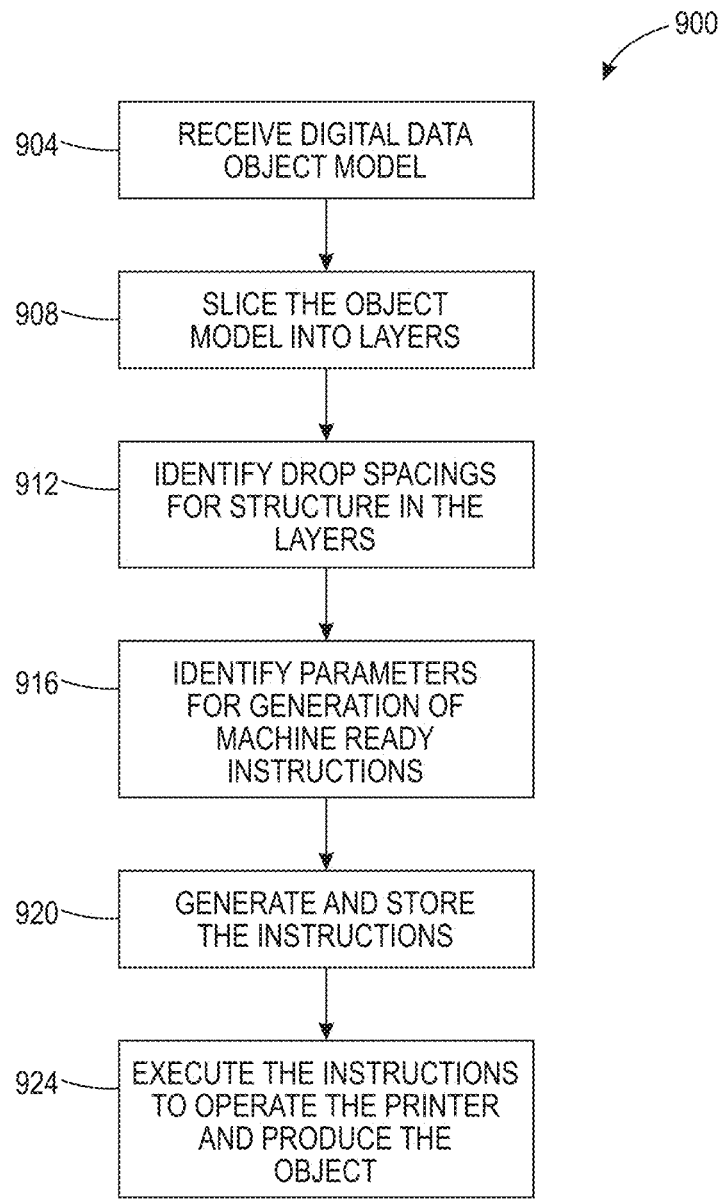
FIG. 9 is a flow diagram of a process used by slicer program to generate machine ready instructions in the printer of FIG. 1.

A process for operating the printer shown in FIG. 1 is shown in FIG. 9. In the description of the process, statements that the process is performing some task or function refers to a controller or general purpose processor executing programmed instructions stored in non-transitory computer readable storage media operatively connected to the controller or processor to manipulate data or to operate one or more components in the printer to perform the task or function. The controller 136 noted above can be such a controller or processor. Alternatively, the controller can be implemented with more than one processor and associated circuitry and components, each of which is configured to form one or more tasks or functions described herein. Additionally, the steps of the method may be performed in any feasible chronological order, regardless of the order shown in the figures or the order in which the processing is described.

FIG. 9 is a flow diagram of a process 900 that generates machine ready instructions for the printer 100 to take advantage of multi-orifice plate 204 and the angles at which the orifices are positioned. The process begins with a digital data model being received (block 904). The digital data model is sliced in a known manner to identify the layers of the object to be produced (block 908). The target drop spacings are identified for the structures in the layers (block 912) and the tool paths, stand-off distances, ejector head frequencies, and ejector head/platform speeds are identified for the machine ready instructions that form each layer (block 916). The machine ready instructions are generated using the identified parameters and stored in a memory for later execution by the controller (block 920). These instructions are executed to operate the components of the printer and form the object (block 924).

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:
1. A 3D object printer comprising:
an ejector head having a single nozzle, the ejector head being configured to eject material through the single nozzle;
an orifice plate having a plurality of orifices that are fluidly connected to the single nozzle of the ejector head so material ejected from the single nozzle is emitted as drops from the plurality of orifices simultaneously, the plurality of orifices are arranged in rows and columns that are orthogonal to one another in the orifice plate and at least two orifices in the plurality of orifices are oriented at an angle not parallel to a normal between the platform and the orifice plate, a first group of orifices in the plurality of orifices are arranged in a first column that is positioned between a second group of orifices arranged in a second column and a third group of orifices arranged in a third column, the orifices in the first group of orifices being oriented at an angle that is parallel to the normal between the platform and the orifice plate and the orifices in the second group of orifices being oriented at a first angle that is not parallel to the normal between the platform and the orifice plate and the third group of orifices being oriented at a second angle that is not parallel to the normal between the platform and the orifice plate;
a platform positioned opposite the orifice plate;
at least one actuator operatively connected to at least one of the platform and the ejector head, the at least one actuator being configured to move the platform and the ejector head relative to one another; and
a controller operatively connected to the ejector head and the at least one actuator, the controller being configured to:
generate machine ready instructions that operate the at least one actuator and the ejector head to achieve a target drop spacing;
operate the at least one actuator to move the ejector head and platform relative to one another;
operate the ejector head to eject material through the nozzle and the plurality of orifices so drops ejected from at least two orifices achieve the target drop spacing on the platform or a surface of an object being formed on the platform at the target drop spacing;

identify a stand-off distance between the orifice plate and the surface of the object on the platform or the platform; and generate a portion of the machine ready instructions to operate the at least one actuator to separate the orifice plate from the platform or the surface of the object on the platform at the stand-off distance.

2. The printer of claim 1 wherein the first angle is equal to but at an opposite direction with respect to the normal between the platform and the orifice plate than the second angle.

3. A 3D object comprising:

an ejector head having a single nozzle, the ejector head being configured to eject material through the single nozzle;

an orifice plate having a plurality of orifices that are fluidly connected to the single nozzle of the ejector head so material ejected from the single nozzle is emitted as drops from the plurality of orifices simultaneously, the plurality of orifices are arranged in a triangular configuration and the orifices are oriented to direct the drops ejected through the orifices toward the center of the triangular pattern;

a platform positioned opposite the orifice plate;

at least one actuator operatively connected to at least one of the platform and the ejector head, the at least one actuator being configured to move the platform and the ejector head relative to one another; and a controller operatively connected to the ejector head and the at least one actuator, the controller being configured to:

generate machine ready instructions that operate the at least one actuator and the ejector head to achieve a target drop spacing;

operate the at least one actuator to move the ejector head and platform relative to one another;

operate the ejector head to eject material through the nozzle and the plurality of orifices so drops ejected from at least two orifices achieve the target drop spacing on the platform or a surface of an object being formed on the platform at the target drop spacing.

* * * * *